H. KELLOGG.

Assignor to H. L. Butler, Jr.

CARTRIDGE.

No. 7,569. Reissued March 27, 1877.

Witnesses
G. W. Helling Jr.
H. W. Hayden

Inventor
Henry Kellogg
By Charles F. Blake,
his Attorney

N. PETERS, PHOTO-LITHOGRAPHER, WASHINGTON, D. C.

UNITED STATES PATENT OFFICE.

HENRY KELLOGG, OF MILFORD TOWNSHIP, NEW HAVEN COUNTY, CONN., ASSIGNOR TO HENRY L. BUTLER, JR.

IMPROVEMENT IN CARTRIDGES.

Specification forming part of Letters Patent No. 35,878, dated July 15, 1862; reissue No. 7,569, dated March 27, 1877; application filed February 1, 1877.

*To all whom it may concern:*

Be it known that I, HENRY KELLOGG, of the township of Milford, formerly of the city and county of New Haven, in the State of Connecticut, have invented a new and useful Improvement in Cartridges for Fire-Arms; and I do hereby declare that the following is a full and exact description of the construction and operation of the same, reference being had to the accompanying drawings, making a part of this specification, in which—

Figures 1, 2, 3, 4:
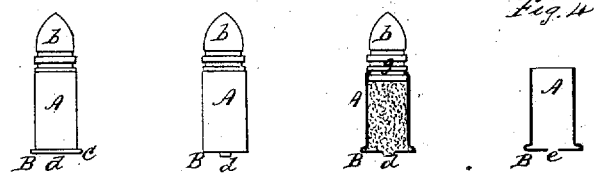
Figure 5:
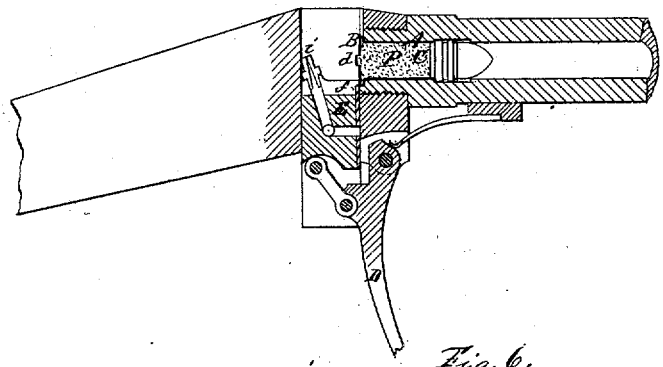
Figure 6:
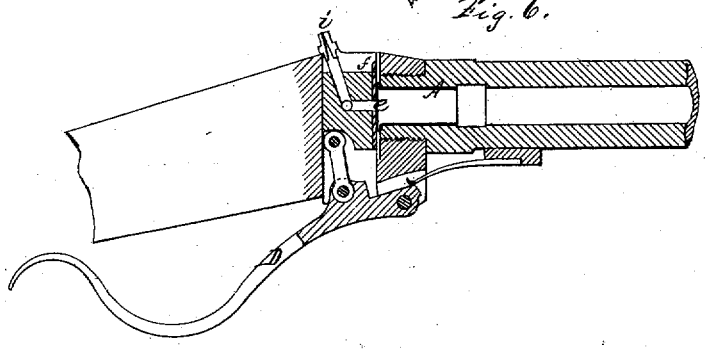

Figures 1 and 2 are complete cartridges of different forms. Figs. 3 and 4 are sectional views. Figs. 5 and 6 illustrate the operation of the same.

The nature of my invention consists in producing a water-proof metallic cartridge, having a projection from the rear so formed from or being a part of the cartridge-case that when removed, as by cutting or otherwise, either at or before the instant of discharge, shall leave an opening through which to receive the flame from the detonating-cap, or other known contrivance independent of the cartridge, to produce an explosion of the powder within the cartridge-case, thus preserving the powder from the atmosphere, and the deleterious and dangerous effects of the fulminates usually used within the cartridge-case; also, in coating the interior surface of the cartridge-case with a solution of gun-cotton in sulphuric ether, or its equivalent, for the purpose of preventing corrosion of the metal, or other deleterious effects arising from the chemical action of the powder in contact with the metal, and also for the purpose of more certain ignition of the entire quantity of powder contained in the cartridge-case.

I construct my cartridge-case A of a cylinder of copper, or other metal, having one end, B, closed, either so as to form a rim, C, Fig. 1, to prevent the escape of gas, or without, as in Fig. 2. From the closed or rear end B I make a projection, *d*, of such form, Fig. 3, that when removed, by cutting or otherwise, will leave an opening into the case *e*, Fig. 4. Into this case A I put the requisite quantity of gunpowder for the charge, (using no detonating-powder within the cartridge.) I then set the ball *b* within the mouth of the cartridge-case A, and turn the metal of the case down firmly into the groove *g* of the ball *b*, for the double purpose of holding the ball and to preserve the powder from the atmosphere; and for the further preservation of the powder, as well as to protect the metal of the case from the chemical action produced by contact with the powder, and at the same time to attain greater certainty of ignition of the entire quantity of powder contained in the cartridge, I coat the interior surface of my cartridge-case with a solution of gun-cotton in sulphuric ether, or its equivalent, to produce the same results.

To enable others skilled in the use of cartridges similar in form to use my own, I will proceed to describe the operation, and for convenience of illustration I employ the arm known as "Sharps rifle."

Open the breech of the gun, as shown in Fig. 5, by dropping the lever D; insert the cartridge C; close the breech, by raising the lever D, in which act the cutter *f*, attached to the slide E, will in its upward passage cut away the projection *d*, and leave an opening, *e*, Fig. 6, directly into the touch-hole of the gun sufficient to allow the free passage of the flame from the detonating-cap *i* (or other known contrivance to produce the same effect) to the powder P within the cartridge-case, to produce the explosion, and when exploded, and the lever D again lowered, as at Fig. 5, the refuse metal may be removed in the ordinary way, or by any known contrivance.

I do not claim the act of cutting off the rear end of a cartridge, as is evidenced by my illustrating my invention in connection with an arm already patented.

What I do claim, and desire to secure by Letters Patent, is—

1. A metallic cartridge-case formed with an outwardly-projecting nipple at the rear end, for the purpose specified.

2. A metallic cartridge-case having an interior water-proof lining, as described.

3. A cartridge-case having an interior lining or coating of gun-cotton dissolved in sulphuric ether, as described.

HENRY KELLOGG.

Witnesses:

E. R. TODD,

R. B. DUNHAM.